Aug. 9, 1949.  F. J. DOHRER  2,478,466
AIR CLEANER
Filed Jan. 23, 1946  2 Sheets-Sheet 1
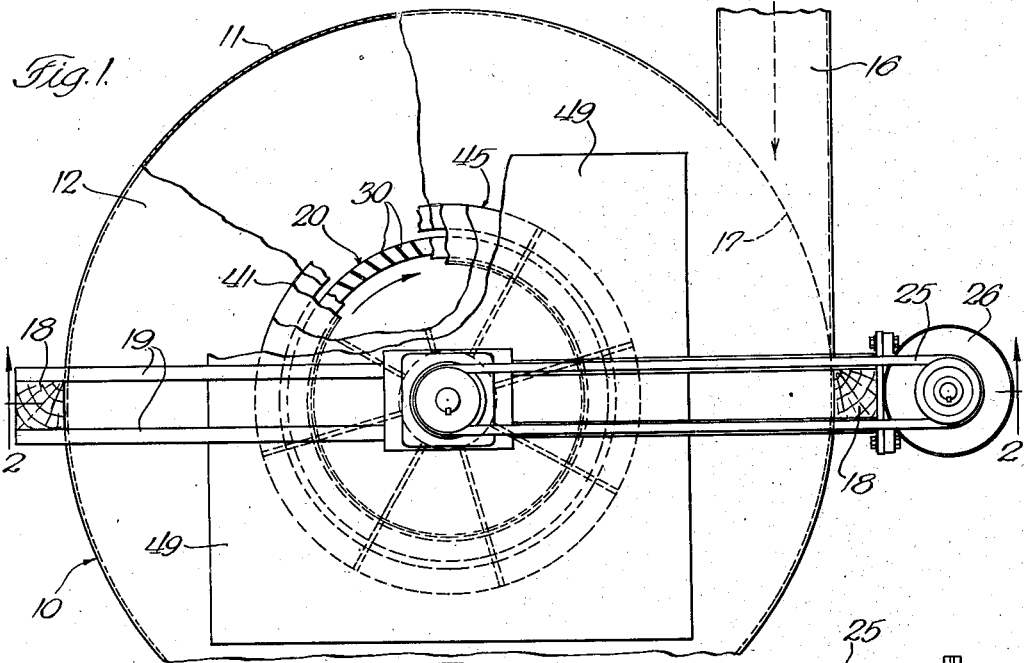
Fig. 1.
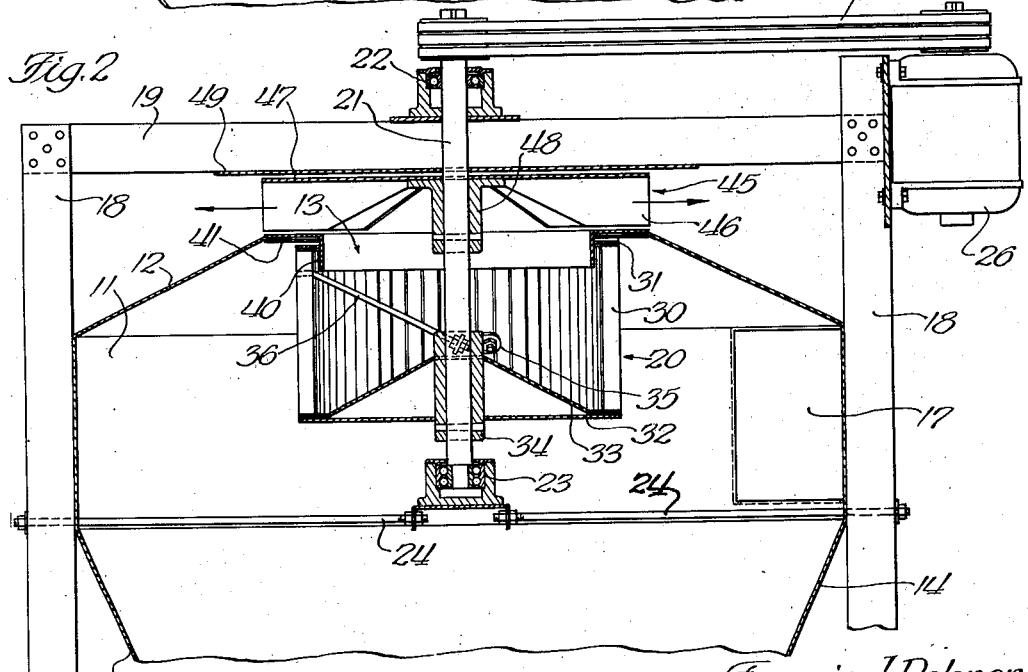
Fig. 2.
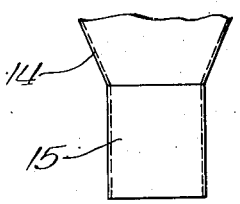
Francis J. Dohrer
INVENTOR
BY Harold D. Cook
ATTORNEY Aug. 9, 1949.  F. J. DOHRER  2,478,466
AIR CLEANER
Filed Jan. 23, 1946  2 Sheets-Sheet 2
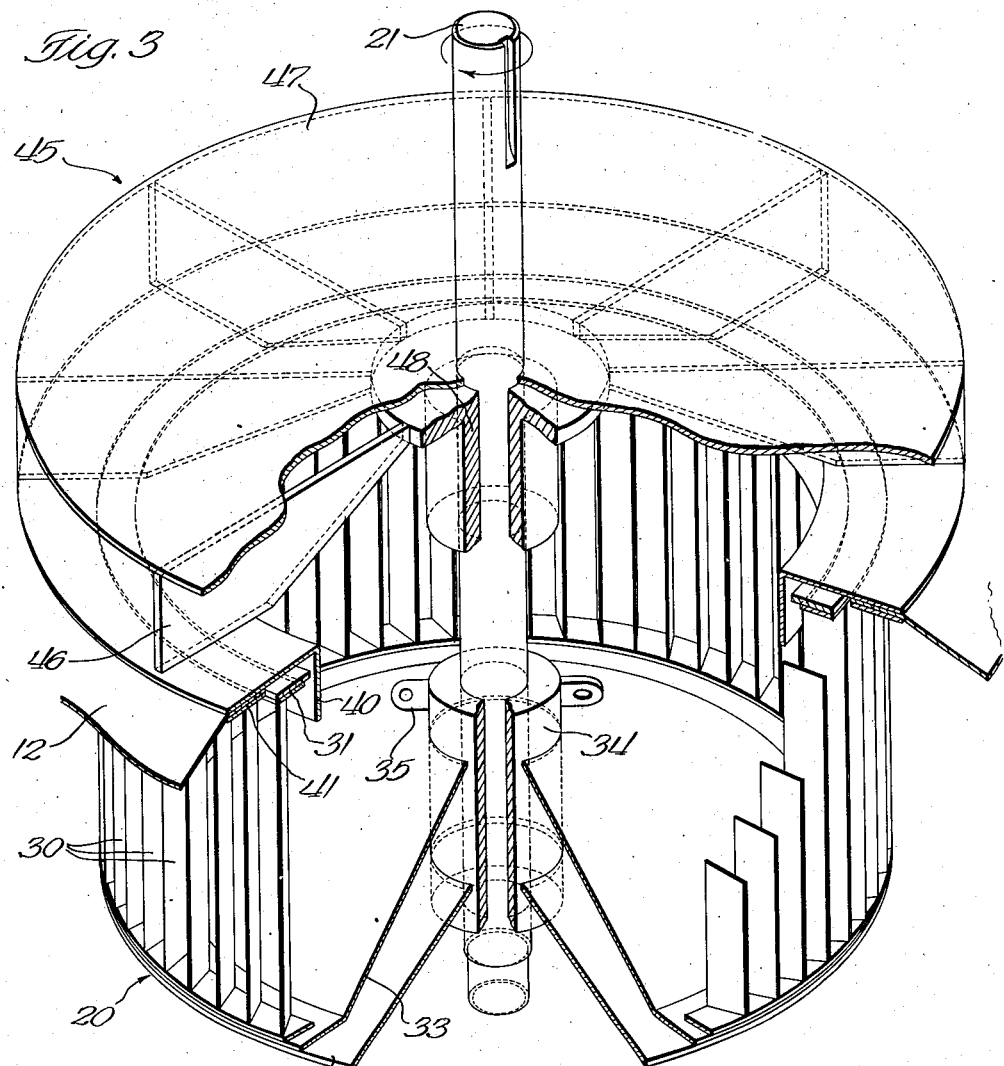
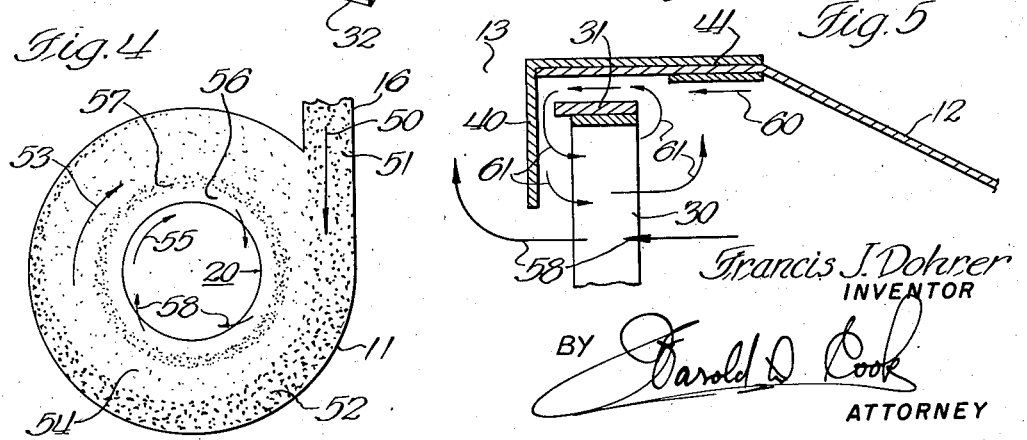
Francis J. Dohrer
INVENTOR
BY Harold D. Cook
ATTORNEY Patented Aug. 9, 1949

2,478,466

UNITED STATES PATENT OFFICE 2,478,466

AIR CLEANER

Francis J. Dohrer, Seattle, Wash.

Application January 23, 1946, Serial No. 642,880

6 Claims. (Cl. 183—77)

This invention relates to an air cleaner for removing dust and other particles carried in a stream of moving air.

The general object of the invention is to provide an air cleaner capable of handling a large volume of air or other gas which is effective to remove fine dust and impalpable powder and other particles of micronic size which have not been heretofore successfully removed by conventional separators.

The present device is used in connection with and comprises an improvement on a cyclone type separator. A conventional cyclone separator, however, is effective only for the separation of relatively large particles, it being generally recognized in the art that such a separator discharges the very fine material along with the stream of air. Where the discharge is directed into the atmosphere, as in various kinds of industrial processes carried out in manufacturing plants, the discharge of a considerable quantity of fine dust has heretofore been accepted as inevitable in spite of the loss of great quantities of material which may have a value, and in spite of the undesirable condition created in the surrounding community. The object of the present invention is, therefore, to provide a device for removing such fine material so that it can be collected and recovered if it is of value, and so that in any event it will not be discharged along with the air stream which constitutes its transporting vehicle.

In a conventional cyclone separator, an air stream carrying solid particles of various sizes is caused to flow in a circular path around the inside of a cylindrical casing. The velocity of the air stream delivered to the casing is such that the centrifugal force acting upon the solid particles causes them to move toward the wall of the casing, where their velocity is retarded so that they gradually settle down and fall out of the rapidly moving air stream. The cylindrical part of the casing is provided with a cone or funnel shaped bottom extending downwardly away from the influence of the rotating air mass and connected with a discharge pipe for removing such particles by gravity. The air stream is discharged through a central vertical tube extending downwardly into the cyclone through a top wall in the casing. The inner stratum of air revolves around this tube and passes out under the lower edge, the depth of the tube varying in different cyclones. This tube of separator produces an efficient separating action on the larger particles by causing them to move outwardly toward the walls of the casing, while the air must move inwardly toward the center to get out of the discharge tube. It is found, however, that impalapable powders and dust particles of micronic size are relatively less affected by centrifugal force, and perhaps due to the large surface area of each particle in comparison with its mass, this fine material is carried toward the center with the air stream and discharged from the casing before a separating action can take place.

In the present invention the air leaving the cyclone casing is caused to pass radially inwardly through the revolving blades of a power driven rotor which takes the place of the conventional re-entrant discharge tube. The rotor is mounted on a vertical shaft concentric with a central outlet opening in the top wall of the cyclone casing, and revolves in the same direction as the air flow within the casing. When the rotor is driven at a velocity exceeding the velocity of adjacent layers of air about to leave the cyclone, the circular movement of the air is accelerated just before it passes inwardly through the rotor, creating an inner mass or core of revolving air moving at a higher velocity than the outer mass of revolving air. The increased rotational velocity of the inner mass of air exerts a greater centrifugal force in this region immediately surrounding the rotor blades to resist the tendency of particles to reach the outlet. Skin friction is produced between these two masses revolving at different velocities, and it is found that very fine dust which has not been separated by the cyclone action will not penetrate through this zone. Instead, it exhibits a tendency to revolve around and move down in this air division so as finally to drop out of the zone of the rotor and settle to the bottom of the cone along with the coarser particles. As a result of this action, the air which leaves the outlet opening in the casing is very free and clean of dust of all particle sizes. The construction and operation of the present device will be better understood, however, with reference to the accompanying drawings illustrating a preferred embodiment of the invention.

In the drawings:

Figure 1 is a top plan view of an air cleaner embodying the principles of the present invention, certain parts being broken away to show the internal structure;

Figure 2 is a sectional view taken on the line 2—2 of Figure 1;

Figure 3 is a perspective view, with parts broken away to show the manner in which the rotor is mounted in the outlet opening of the cyclone casing;

Figure 4 is a top plan view with the top of the casing removed illustrating the two phases of the separating action that takes place when the device is in operation; and Figure 5 is an enlarged view of the top end of the rotor showing the action of a local return circulation which is produced adjacent the outlet opening to act as a frictionless air seal.

The numeral 10 designates, generally, a cyclone casing having a vertical cylindrical wall 11, a top wall 12 having a central air outlet opening 13, and a bottom cone 14 for collecting solid particles and depositing them in a pipe 15. Dust laden air is admitted tangentially into the casing from a pipe 16 through an opening 17 in the cylindrical wall 11. These parts may be made of sheet metal with dust tight joints in the manner of a conventional cyclone separator. Support for the cyclone casing is provided by a pair of standards 18 interconnected at their tops by a pair of cross members 19.

A rotor 20, having a shaft 21, is mounted in an upper bearing 22 on the cross members 19 and a lower bearing 23 maintained in vertical alignment within the cyclone casing. The bearing 23 is maintained in proper position by rods 24 anchored in the standards 18, and in a large installation suitable additional supporting and positioning means may be provided. The shaft 21 is driven by belts 25 from an electric motor 26.

The rotor 20 comprises a plurality of vertical blades 30 mounted between a top ring 31 and a circular bottom plate 32. The bottom plate 32 and a conical stiffening plate 33 are carried by a hub 34 by which means the rotor is mounted on the shaft 21. A number of ears or lugs 35 are provided on the upper end of the hub 34 above the conical plate 33 for anchoring the inner ends of struts 36, the outer ends of which are secured to certain of the blades 30 just below the ring 31. Although the rotor blades 30 are set angularly in the general arrangement of fan blades, the blade angle is not critical and the blades may be set in radial planes if desired.

Extending downwardly within the ring 31 is a dust seal ring or flange 40 attached to a flat top wall portion 41 in the center of the conical top wall 12. The parts are so proportioned and the rotor is so mounted that the top ring 31 of the rotor is spaced closely below the top plate 41 of the casing and closely surrounding the cylindrical flange 40. The width of the blades 30 is such that their inner edges also revolve very closely adjacent to the flange 40 so that any dust escaping between the ring 31 and the top wall 41 is forced to travel downwardly along the wall of the flange 40 adjacent the inner edges of the blades and become subject to the action thereof before it has access to the opening 13. The bottom of the rotor being closed by the plates 32 and 33, there is no other escape for air within the cyclone casing except to pass between the revolving rotor blades. The slope of the conical plate 33 prevents material from collecting in the bottom of the rotor.

Air containing dust and other particles introduced into the cyclone casing through the pipe 16 is forced to follow a circular path around the inside of the cylindrical side wall 11. The centrifugal effect of this rotary motion causes the larger and heavier particles to immediately impinge against the side wall where their velocity is reduced sufficiently to cause them to take a downward path into the slower moving air in the bottom cone 14. This is the conventional cyclone action and is effective only in removing relatively coarse particles, the finer dust being carried with the air current in its circular motion within the casing. In a conventional cyclone this finer material would be carried inwardly in the tightening spiral of motion of the air stream and be discharged therewith through the outlet opening. In the present device, however, the rotor 20 is driven so that the blades 30 revolve in the same direction as the air flow therearound but at a considerably higher velocity. The rotor thereby establishes an air mass therearound which is revolving at a higher speed than the surrounding air and subjecting suspended particles to increased centrifugal force. The influence of the rotor, however, does not extend outwardly very far beyond the blades, and so the inner high speed revolving mass of air constitutes a fairly well defined cylinder of air producing a skin friction phenomenon as it slides around within the outer mass of revolving air. Although all the air which is introduced by the pipe 16 must eventually pass between the rotor blades 30 to escape through the outlet 13, the dust carried thereby will not penetrate this skin friction zone, but will continue to revolve around at a distance from the rotor and gradually settle down to drop out of the zone of influence of the rotor to be collected and discharged along with the coarser particles from the bottom outlet of the casing. In operation, it is observed that the air is clear and free of dust immediately around the rotor, and that the very fine dust appears to collect in a ring concentric with the rotor but spaced a short distance therefrom.

This action is illustrated in Figure 4, wherein the arrow 50 indicates the direction of flow of a heterogeneous collection of large and small particles 51 introduced through the tangential inlet pipe 16. As the air stream is deflected into a circular path, the larger particles very soon impinge upon the cylindrical wall 11 and form a fairly well defined layer 52 of increasing concentration and reduced thickness as it moves around the interior of the casing. Direct frictional engagement with the wall 11 and the relatively lower velocity of the layer of air immediately adjacent this wall quickly retards the motion of these particles to such an extent that they soon descend to a lower level and so the layer 52 is represented as gradually disappearing from the plane of the view in Figure 4 as the bulk of this material drops below this plane. Meanwhile, the principal air mass is rotating within the casing, as indicated by the arrow 53, and carrying a certain amount of finer material 54 which does not readily respond to centrifugal action. The arrow 55 indicates the direction of rotation of the rotor 20 at a velocity considerably greater than that of the material 54, so as to induce relatively high speed rotation and greater centrifugal forces in an air mass 56 immediately surrounding the rotor. The numeral 57, then, represents a concentration of the fine material 54 which has moved inwardly toward the rotor but which refuses to penetrate through the skin friction zone existing on the outer fringe of the air mass 56. The air mass 56, therefore, defines a zone which is clear and free of dust immediately adjacent the rotor. The ring or cylinder of fine dust 57 continues to revolve around this clear zone until it settles out at the bottom, the path of each particle in the ring 57 being a downward spiral or helix. When the device is in operation the various size dust particles form themselves into a fixed pattern of this kind, although the individual particles are moving at high speed and are constantly being replaced by other particles as long as fresh material 51 is being supplied. Similarly, the air in the mass 56 is constantly changing, although the size and shape of its pattern does not change, since air must leave this mass at the same rate that new air is introduced through the pipe 16. The arrows 58 indicate the path of air leaving the clear air mass 56 and passing between the rotor blades on the way to the outlet 13.

The flange wall 40 makes a very effective dust seal. Dust particles passing between the top of the rotor and the top of the casing reach a position in descending along this wall where they become subject to the influence of the rotor and are thrown out by the centrifugal fan action of the blades 30. In fact, in operation it may be assumed that there is a continuous flow of primary air above the top of the rotor, down between the rotor and the wall 40, and out through the blades 30, which local circulation of air effectively prevents the dust from passing under the lower edge of the wall and out of the opening 13. This action is illustrated in Figure 5, wherein the arrows 58 indicate the path of air discharged through the rotor blades as shown in Figure 4. The arrow 60 indicates the path of air moving radially inwardly across the top of the casing 41 in an attempt to escape to the outlet opening through the clearance between the upper edge of the rotor and the casing. The arrows 61 indicate the local circulation of this primary air in a closed circuit through which it is always returned back through the rotor blades to the interior of the casing. This arrangement provides a frictionless dust seal without resorting to a liquid trough, packing or other conventional expedient.

Different kinds of dust require different relative rotor speeds in order to obtain the desired air cleaning action. When the various parts are proportioned approximately as shown in the drawings, it is usually found that best results are obtained by operating the rotor at a peripheral speed about twice that of the air entering the casing, but the invention is not limited to these proportions or relative velocities as these factors must be determined independently in different installations.

Inasmuch as the major air mass within the casing is primarily motivated by the velocity of the incoming air, the only power required to operate the rotor is that necessary to impart an increased velocity to the relatively small inner air mass, or, in other words, the only additional energy required is a relatively small amount to increase the velocity of the air just prior to and during its passing through the rotor. The motor 26 is, therefore, of relatively low power output as compared with the motor driving the blower which delivers the air stream through the pipe 16.

It will be observed that the rotor blades 30 exert a centrifugal action on the air in opposition to the inward direction of the air flow approaching the outlet 13. To avoid creating an appreciable back pressure in the system it may be desirable to counteract this effect by a booster fan to restore the over-all pressure differential and air flow to the value it would have in a conventional cyclone. For this purpose an exhaust fan 45 is provided immediately above the outlet 13. This fan comprises a plurality of radial blades or vanes 46 attached to a circular plate 47 on a hub 48 which is mounted on the shaft 21. As shown, the fan 45 exhausts into the atmosphere, but it may exhaust into another pipe if desired. In the present arrangement, shield or guard plate 49 is attached to the cross members 19 immediately above the fan 45.

In the foregoing description the pressure head for producing an air flow through the system may be produced by a blower which maintains greater than atmospheric pressure in the delivery pipe 16. However, this machine can also be operated under suction wherein the intake end of the delivery pipe 16 is open to atmospheric pressure and the exhaust fan 45 operates to reduce the pressure in the outlet 13 below atmospheric to establish a pressure differential adequate to maintain the desired air flow. In such case the fan 45 is designed large enough to act as the primary fan to operate the entire circuit under suction, the motor 26 being of sufficient horsepower to operate this circuit in addition to the rotor 20. The fan 45 under these conditions may, of course, discharge tangentially directly into the atmosphere as shown, or into a conventional spiral fan casing. When the pressure in the casing is below atmospheric, the dust discharge outlet 15 must be air sealed with a valve or the like to prevent the entrance of air at that point.

The present device is susceptible of various changes in the construction and arrangement of parts, and all such modifications capable of the hereinabove described mode of operation which are within the scope of the appended claims are included in the invention.

Having now described my invention and in what manner the same may be used, what I claim as new and desire to protect by Letters Patent is:

1. Improvements in a cyclone type air cleaner having a top wall provided with an outlet opening constituting the only opening in said top wall and an inwardly directed circular flange around said outlet opening, and adapted for operation at pressures above atmospheric, comprising a rotor having a conical bottom end wall and a top circular ring spaced apart by a plurality of narrow longitudinal blades forming a cylindrical cage, said ring end of said rotor being closely spaced from said end wall of said separator and positioned such that a portion of the length of said blades rotates closely around said flange for producing a local circulation of air between said ring and said end wall through said cage and back into said separator without turbulence.

2. Improvements in a cyclone type air cleaner having a vertical cylindrical casing, a tangential air inlet in said casing constituting the only opening in the cylindrical wall of said casing, and a top wall in said casing provided with a circular outlet opening concentric with said casing constituting the only opening in said top wall, comprising a cylindrical cage rotor having a plurality of narrow longitudinal blades, one end of said rotor being spaced closely adjacent said top wall and mounted for rotation around said outlet opening, a flange around said outlet opening extending within said rotor for a portion of the length of said blades and close to said blades to cause air passing through the space between said top wall and the end of said longitudinal rotor to be subjected to the influence of said rotor blades and returned to the interior of said casing without turbulence to prevent the escape of air from within said casing around the end of said rotor.

3. An improved cyclone type air cleaner for removing very fine dust and the like from a gaseous stream, comprising a casing with a vertical cylindrical wall, a tangential gaseous stream inlet in said wall constituting the only opening in said wall, a top wall on said casing having a circular outlet opening, a cylindrical flange depending from the rim of said outlet opening, and a vertical rotor in said casing having narrow longitudinal blades forming a cylindrical cage rotating closely adjacent said flange with the flange extending into the rotor and along said blades, said casing being extended downwardly from said cylindrical wall to provide a relatively quiescent settling chamber for the gradual settling of dust moving in circular paths around said casing.

4. An improved cyclone type air cleaner for removing very fine dust and the like from a gaseous stream, comprising a casing with a vertical cylinder wall, a tangential gaseous stream inlet in said wall constituting the only opening in said wall, a top wall on said casing having a circular outlet opening constituting the only opening in said top wall, a rotor in said casing having narrow vertical blades forming a cylindrical cage extending close to said top wall and rotatable concentric with said outlet opening, a circular flange depending from the rim of said outlet opening and extending into said rotor closely adjacent and beneath the upper ends of said blades for producing a circulation of primary air at said flange and top wall without turbulence to prevent escape of said air around the end of the rotor, and a conical bottom on said casing beneath said cylindrical wall forming a relatively quiescent settling chamber for the gradual downward spiral movement of dust traveling in a predominantly circular course in said casing.

5. An air cleaner comprising a casing having a vertical and generally cylindrical peripheral upper side wall, a horizontal tangential air inlet opening in the upper part of said cylindrical wall adapted to impart a circular streamline flow to dust laden air introduced into said casing through said inlet for the immediate separation of coarse particles from the air stream, a top wall in said casing having a central circular outlet opening, said inlet and outlet openings constituting the only air inlet and outlet openings in said casing, a circular flange integral with said top wall depending from the margin of said outlet opening and extending down into said casing, and a cylindrical cage rotor having a large number of blades, all of the blades being narrow longitudinal blades mounted in the periphery of the rotor, said rotor being mounted in bearings on a vertical axis concentric with said outlet opening for rotation in the direction of said circular air flow within the casing and driven at a peripheral speed in excess of the normal velocity of said circular air flow around the rotor to keep fine dust revolving around the rotor in a streamlined cylindrical layer without turbulence so that it can gradually settle vertically by gravity below the zone of influence of the rotor and into a more quiescent zone in the lower part of the casing, the upper end of said rotor closely surrounding said flange, and the lower end of said rotor being closed to compel all the air leaving said casing to pass between said rotor blades.

6. An air cleaner comprising a casing having a top wall and a peripheral side wall having a vertical cylindrical upper portion connected with said top wall, a tangential air inlet in said cylindrical side wall arranged to impart a circular streamline motion to dust laden air to cause heavier particles in the air to move outwardly against said side wall by centrifugal force, an outlet opening in the center of said top wall constituting the only opening in said top wall, a cylindrical flange on said top wall extending into said casing from the margin of said outlet opening, and a vertical cylindrical cage rotor in said casing having a large number of blades, all of the rotor blades being narrow longitudinal vertical blades mounted in the periphery of the rotor, the lower end of said rotor being closed and the upper end of the rotor closely surrounding said flange, said rotor being driven in the direction of said circular air motion to increase the rotational velocity of a central mass of said air without turbulence to prevent the continued inward movement of fine dust particles toward said rotor and outlet opening.

FRANCIS J. DOHRER.

REFERENCES CITED

The following references are of record in the file of this patent:

UNITED STATES PATENTS

| Number | Name | Date |
|---|---|---|
| 410,152 | Cockrell | Sept. 3, 1889 |
| 1,459,982 | McKee | June 26, 1923 |
| 2,269,412 | Sturtevant | Jan. 6, 1942 |
| 2,273,341 | Vollmer | Feb. 17, 1942 |
| 2,374,238 | Schneible et al. | Apr. 24, 1945 |